(12) United States Patent
Mishra et al.

(10) Patent No.: US 9,471,693 B2
(45) Date of Patent: Oct. 18, 2016

(54) LOCATION AWARENESS USING LOCAL SEMANTIC SCORING

(71) Applicant: Microsoft Corporation, Redmond, WA (US)

(72) Inventors: Pragyana K. Mishra, Bellevue, WA (US); Nagareddy S. Reddy, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 13/905,025

(22) Filed: May 29, 2013

(65) Prior Publication Data

US 2014/0358897 A1  Dec. 4, 2014

(51) Int. Cl.
*G06F 17/30* (2006.01)
*G06F 7/00* (2006.01)

(52) U.S. Cl.
CPC ................................. *G06F 17/3087* (2013.01)

(58) Field of Classification Search
CPC ........................ G06F 17/3079; G06F 17/3078
USPC ............................................................. 707/722
See application file for complete search history.

(56) References Cited

U.S. PATENT DOCUMENTS

| 7,248,184 | B2 * | 7/2007 | Gelhar | G01C 21/3446 340/5.61 |
| 7,627,425 | B2 * | 12/2009 | Salmre | G06F 17/30241 340/995.14 |
| 8,452,109 | B2 * | 5/2013 | Alldrin | G06K 9/4661 345/20 |
| 8,738,422 | B2 * | 5/2014 | Lerner | G01C 21/32 701/1 |
| 8,898,173 | B1 * | 11/2014 | Badoiu | G06F 17/3087 707/748 |
| 2009/0018996 | A1 | 1/2009 | Hunt et al. | |
| 2009/0088967 | A1 | 4/2009 | Lerner et al. | |
| 2009/0132468 | A1 | 5/2009 | Putivsky et al. | |
| 2011/0087685 | A1 | 4/2011 | Lin et al. | |
| 2013/0035853 | A1 * | 2/2013 | Stout | G06T 17/05 701/438 |

OTHER PUBLICATIONS

Yu, et al., "Matching User's Semantics with Data Semantics in Location-Based Services", In 1st Workshop on Semantics in Mobile Environments, May 9, 2005, 6 pages.
Yiu, et al., "Ranking Spatial Data by Quality Preferences", In IEEE Transactions on Knowledge and Data Engineering, vol. 23, Issue 3, Mar. 2011, 15 pages.
Ma, et al., "Landmark-based Location Belief Tracking in a Spoken Dialog System", In Proceedings of the 13th Annual Meeting of the Special Interest Group on Discourse and Dialogue, Jul. 5, 2012, 10 pages.
He, et al., "A Social Network-Based Recommender System (SNRS)", In Doctoral Dissertation—A Social Network-based Recommender System, Retrieved on: Apr. 24, 2013, 31 pages.
Cankaya, et al., "Enhancing Location Information Using Semantic Composition", In IEEE 13th International Conference on Computational Science and Engineering, Dec. 11, 2010, 5 pages.
Schmachtenberg, Max, "Enhancing a Location-based Recommendation System by Enrichment with Semantic Web Data", Published on: Dec. 2012, Available at: http://www.ke.tu-darmstadt.de/lehre/arbeiten/diplom/2012/Diplomarbeit_Max.pdf.
"International Search Report and Written Opinion Issued in PCT Patent Application No. PCT/US2014/039632", Mailed Date: Jun. 25, 2015, 7 Pages.

* cited by examiner

Primary Examiner — Kuen Lu
(74) Attorney, Agent, or Firm — Dave Ream; Tom Wong; Micky Minhas (57) ABSTRACT

Systems and methods are provided for determining continuous scoring models that describe one or more features regarding a geographic area. The scoring models can be fit to incorporate information from both point sources as well as area information. Based on the scoring models, a user can obtain feature values for the one or more features at any desired location or for a desired geographic area. Because the features are represented by a continuous function, comparisons of feature values for arbitrary geographic areas and/or combinations of features to form secondary values can also be performed.

20 Claims, 10 Drawing Sheets

LOCATION AWARENESS USING LOCAL SEMANTIC SCORING

BACKGROUND

Search engines continue to gain improved capabilities for identifying responses to a search query that are relevant based on a relative location. Location based features can allow a search engine to filter out entities and/or other results that are not relevant to a location specified by a user, such as the user's current location. Based on such features, once a location is specified, a user can determine whether nearby services are of interest, such as whether there are nearby restaurants, retail stores, or other entities of interest. While this type of location-based searching is beneficial, a user is still required to specify an initial location in order to start a search. Thus, a user that is unfamiliar with a particular geographic area has a limited ability to use a search engine to find features of interest, such as dining or entertainment. For example, the user cannot browse an area or discover entities of interest based on higher level preferences or semantic interests.

SUMMARY

In various aspects, systems and methods are provided for determining continuous scoring models that describe one or more features regarding a geographic area. The scoring models can be fit to incorporate information from both point sources as well as area information. Based on the scoring models, a user can obtain feature values for the one or more features at any desired location or for a desired geographic area. Because the features are represented by a continuous function, comparisons of feature values for arbitrary geographic areas and/or combinations of features to form secondary values can also be performed.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

In various aspects, systems and methods are provided for determining smooth, continuous functions that describe one or more semantic features regarding a geographic area. The smooth, continuous functions can be fit to incorporate information from individual entities at single locations as well information generally related to some type of geographic area. Based on the underlying functions, a user can obtain feature values for the one or more features at any desired location or for a desired geographic area. Because the semantic features are represented by a continuous function, comparisons of feature values for arbitrary geographic areas can also be performed. This can allow for identification of, for example, the area within a city with the highest dining or restaurant score, or an area with a desired combination of dining, entertainment, and accessibility scores. A user can also choose to investigate the features of a geographic area at a desired level of abstraction.

Constructing a Scoring Model for Features

As a first step in providing feature information, various types of data related to a feature of interest can be identified. The identified data can then be used to fit a basis function for development of a data model that is continuous over at least a region of interest.

A "feature" is defined as any convenient type of information that can be represented numerically as a semantic score or feature score. The feature score for a feature is determined based on underlying data that is identified as being relevant to the feature. For example, one type of feature can be a "dining" feature, where the dining score represents the number, quality, and/or other information regarding restaurants that are relevant to a feature score location. Each of the individual restaurants that are identified as relevant to a feature score location can be represented as a data point that contributes to the function for determining a dining score. Other features based on data that corresponds to individual data point values can include a live music feature, a bar or pub feature, a shopping feature, a green space feature, or any other type of feature where a score can be developed based on individual entities or other data points that are identified as relevant for the feature. Optionally, individual data points can be referred to as "dimensionless" data, as the individual data points do not have any meaningful spatial extent when displayed on a map of reasonable scale. Instead, the data points are typically associated with a single location, such as a single street address.

Other types of features can be based on data for a defined geographic area. Some types of features can correspond to features based on distance to a river or distance to a major thoroughfare (such as a main road or a highway). This type of feature can generally be described as having line-based data for a geographic area corresponding to the river or road/highway. Optionally, this type of feature can be referred to as having 1-dimensional data, with a "length" dimension that corresponds to the geospatial path of the feature. Still other features can correspond to area based values, such as crime statistics (for a "safety" feature), population density, number of cars and/or average speed on one or more nearby streets (for a "traffic" feature), or a "school quality" feature based on one or more public schools associated with a location. Such features can optionally be referred to as having two-dimensional data.

Any type of feature that can be represented as a numerical value can be represented as a feature based on a scoring model. Some potential features can include, but are not limited to, entertainment features, such as features for dining, wine, pubs, (live) music, theater, movies, athletics, hiking, snow sports, beach access, tourist attractions, or any other type of entertainment feature that is desired. As indicated by the above list, many of the entertainment features represent features corresponding to point locations, although some features (such as beach access) may represent line-based data. Other examples of features can be lifestyle features, such as features for population density, traffic, accessibility (such as distance from major thoroughfares), pedestrian friendly or walkability, bike-friendly, school quality, crime, family-friendly, or shopping. Still other examples of features can include social media features such as the relative number of check-ins by social media users at a location or the number of "likes" for a location.

A "basis grid area" refers to a single grid area for use in determining a continuous function to represent the data associated with a feature. Prior to determining a function to represent data associated with a feature, a region corresponding to at least a relevant area of interest is divided into a grid containing a plurality of basis grid areas. Preferably, the basis grid areas are formed using a regular tessellation, such as dividing a region into squares, rectangles, or other parallelepipeds. The size of an individual basis grid can be any convenient size. One option is to select square basis grids that have roughly the size of a city block in a metropolitan area. As an alternative, the size of a basis grid can vary, such as by using smaller basis grid areas in a metropolitan area and larger basis grid areas in a rural area. It is preferred but not required for the same basis grid areas to be used for multiple features, such as using the same basis grid areas for all features. This can facilitate combining feature scores from different features.

A "basis function" is defined as a function that is used to represent at least a portion of the data associated with a feature in a basis grid area. Gaussian functions represent a convenient choice for representing feature data within a basis grid area, although other functional forms could be suitable. For a given feature, one or more basis functions can be used to represent the data within a basis grid area. For example, for point or location based data, a single (Gaussian) basis function could be used to fit the data, or a plurality of Gaussians equally spaced within the grid area, or a Gaussian could be associated with each data point. Still other alternatives can also be used, so long as the one or more basis functions can be used to represent the data within the basis grid area. One or more Gaussian functions can similarly be used to represent line-based and area-based data within a basis grid area. The data values assigned to the point, line, and/or area based feature data can then be used to fit the one or more basis functions.

The basis functions from a plurality of grid areas can then be used to determine a scoring model for a feature. (Alternatively, if the feature data has an appropriate form, the scoring model can be fit directly to at least a portion of the feature data.) The plurality of grid areas used for determining the scoring model for a feature can be selected in various ways. In some aspects, basis grid areas with basis functions may be available for a large region, such as the United States. In such aspects, it is possible to use all of the available grid areas to calculate the scoring model. As an alternative, the grid areas within a cutoff distance and/or that satisfy some other relative criteria can be selected for calculating the scoring model. Preferably, the selected plurality of grid areas allow for calculation of a continuous scoring model within a region of interest, such as a region identified by a user. In an alternative embodiment, a large region (such as the United States) can be divided into a various pluralities of grid areas in advance, with scoring models calculated in advance and/or on a periodic basis for each of the various pluralities of grid areas.

A variety of functional forms can be used for a scoring function. One method for calculating a scoring model is to initially attempt to fit functions of different functional forms for each different feature. Examples of suitable functional forms include Gaussian functions, exponential functions, and cubic functions. For each type of functional form, a function can be assigned to each basis grid area. The functions are then fit to the basis functions within the grid areas, such as by weighted least-squares regression. The functional form that provides the best (or otherwise desired) fit during this initial attempt is then selected as the functional form for the scoring model for that feature.

It is noted that although a separate function is assigned to each basis grid area for building the scoring model, the value of the function assigned to basis grid area will typically not be zero at the boundary for the basis grid area. Instead, the functions from (at least) adjacent grid areas can have meaningful non-zero values within a grid area. Thus, at the boundaries between grid areas, the scoring model can still be continuous, as the scoring model at all locations represents a sum over a plurality of continuous functions.

After the initial fit to select a functional form for the scoring model, the underlying data and/or basis set functions within grid areas can be regularized to remove and/or minimize the effects of missing or spurious data. For example, data values for some features may be reported less frequently, such as data values for a "wine" feature. Within a city, a grid area may not have data values for a "wine" feature, even though the grid area has a high score for a "restaurant" feature and adjacent grid areas have high scores for the "wine" feature. If there is sufficient data, as described below, a data value for the "wine" feature can be inferred and assigned to the grid area (using a suitable basis function).

After regularizing the scoring model, additional iterations can be performed to fit the scoring model to the underlying basis functions/data. The additional iterations can be performed until one or more criteria are satisfied, such as having the residual value from the fit that is below a threshold value or having residual values from multiple iterations that differ from each other by less than a tolerance value.

After fitting a scoring model over a plurality of basis grid areas, the scoring model can be used to determine the feature score at a point or over an area. A "feature score location" is defined as a single point or a defined area where a feature score is requested for one or more semantic features. When a feature score location corresponds to a single point, the single point can be selected by any convenient method. For example, a user can identify the single point on a map by selecting a location on a touch screen, or a default location such as the user's current position can be used. When a feature score location corresponds to an area, the area can be defined in any convenient manner. One option is to use a radius (such as a pre-defined radius or a user-selected radius) that provides a bounding shape around a location. Another option is to use another type of bounding shape around a location. The bounding shape can be pre-defined in shape and dimension, pre-defined in shape with one or more user-selected dimensions, or the bounding shape can be completely specified by a user. Still another option is to have a bounding shape where at least one boundary is automatically selected based on local geography, such as using a river or a major thoroughfare as part of the boundary. Yet another option is to use a pre-defined geographic area as a bounding shape, such as using the boundaries for a zip code or the boundaries for group of houses built as part of a single housing development. When the feature score location corresponds to an area, the feature score location can have any convenient size, so long as the boundaries for the feature score location can be defined. One way of determining a feature score location is to use a point or area associated with a responsive result for a search query. Alternatively, a feature score location can be directly defined by a user, or a feature score location can be inferred, such as from user context.

A "sampling area" has a definition similar to a feature score location, but represents an area that is sampled in order to identify one or more feature score locations that satisfy a threshold value for one or more features. Satisfying a threshold value can correspond to being greater than a threshold value, being less than a threshold value, or a combination thereof.

When a feature score is requested for a feature score location, the feature score is determined by appropriately sampling the scoring model. For a feature score location corresponding to a single point, the scoring model is sampled at the selected point. For a feature score location corresponding to an area, several options are available. One option is to integrate the scoring model over the area corresponding to the feature score location. Another option is to determine an average score for the feature score location by sampling at various points within the feature score location. Still a third option is to display a "heat map" of the score within the feature score location, where variations in the feature score are depicted visually, such as by using the color spectrum to indicate variations between a low score value and a high score value. Variations in the displayed colors within the color spectrum can then indicate various intermediate score levels between the low score value and the high score value.

It is noted that the scoring model provides a continuous function for determining a feature score. As a result, the scoring model can be used to provide a feature score at any level of detail desired by a user. This means that a single feature score value is not assigned to a basis grid area, and then used as the value for all requests involving the basis grid area. Instead, because feature scores are determined by sampling the continuous function corresponding to the scoring model for the feature, the value of a feature score will usually vary within a basis grid area. For example, when the feature score location is an individual point within a basis grid area, the resulting feature score from sampling the scoring model will typically not be equal to the average feature score for the basis grid area. Instead, a feature score is available for each point within each basis grid area. Similarly, when a feature score location corresponds to an area, feature score(s) for the defined feature score location can be returned based on the sampled values for the feature score in the feature score location, and not simply on a pre-calculated average value for the underlying basis grid areas that overlap with the feature score location.

Updating the Scoring Model

The scoring model for a feature can be updated periodically and/or as needed to reflect changes in the underlying identified feature data. It may be desirable to update the scoring model for some features on an hourly, daily, or weekly basis in order to reflect changes. For example, during the summer, a variety of parks and other businesses may have outdoor concerts, movie showings, etc. These events may only occur one day a week, and only for certain weeks of the year. By updating the scoring model on a daily basis for a live music feature, the live music feature can change for a given feature score location to reflect the availability of the additional outdoor events. Other update frequencies may be suitable to capture other activities. For example, one type of feature can be a feature related to activity on a social network, such as the number of check-ins registered at a given entity or give geographic area/location on a social media site during the past hour. This can be an indicator of a popular nightspot, and therefore could be a feature of interest. In order to capture the most recent check-in data, the scoring model for a "check-in" feature could be updated in real-time for a point location or a small area by updating the scoring model when a request is received for a feature score. Another type of feature could be a number of "likes" registered on a social network for an entity or geographic area/location within a period of time. Such an update to the scoring model could be performed based on a relatively small number of nearby basis grid areas. Even for a point location, a "check-in" or "like" type feature would likely involve calculation based on nearby basis grid areas, so the number of check-ins (or likes) at a desired location can be compared with check-in (or like) activity at other nearby locations.

Display of Feature Scores

A scoring model can be developed for any type of feature where the feature can be represented by a numerical value, or alternatively as a continuous range of values even if a number is not explicitly associated with any or all points in the continuous range. Typically, the scoring model can be normalized so that the maximum and minimum values from the scoring model fall within a desired range. Examples of potential value ranges for a feature can include ranges of 1 to 100, 0 to 10, −20 to 20, ranges where one or more digits are provided after a decimal point to allow for further distinction, or any other convenient type of range. Optionally, the score for a feature can be further illustrated using a secondary display attribute, such as using a color, font characteristic, or another display attribute to qualitatively indicate the feature score.

For a feature score location that corresponds to an area, the provided feature score can vary depending on the type of request made by a user and/or the specific aspect of the invention. One option for returning a feature score for a feature score location corresponding to an area is to provide an average score for the feature score location. As described above, this can be an average based on an integral of the scoring model over the area corresponding to the feature score location, a sampling of discrete points (such as randomly distributed points, evenly distributed points, or equally spaced points) within the feature score location, or another convenient type of average. Another option for returning an area-based feature score is to provide feature values for the area. One option is to use a heat map, which can provide a continuous representation based on display of color of how the feature score varies within the feature score location. Another option is to select discrete points for reporting feature scores within the area. The discrete points can be randomly distributed points, points selected to be evenly distributed the feature score location, points that are notable due to having a high/low/median score value within the feature score location, or discrete points selected by any other convenient method.

After generating a scoring model for one or more features, a variety of options are available for surfacing a feature score to a user. One option is to provide feature scores as part of supplemental information in connection with search results. For example, a user may want to find a Mexican restaurant that is in a neighborhood where live music or pubs is likely to be available nearby. To find this, the user can first perform a search for Mexican restaurants in a geographic area, possibly including the name of a favorite restaurant chain. This will return a plurality of search results for restaurants. Along with the standard links, a tab or another selectable indicator can be provided next to a link for each restaurant location. Accessing this tab (such as by clicking, hovering, or another selection method) can show feature score information for the particular location. The feature score information can encapsulate one or more semantic attributes of the geographic area for the location. This feature score information can be shown in a sidebar area, as a pop-up message, or in another convenient manner. The user can specify in advance that feature scores for "live music" and "pubs or bars" should be displayed, or these features can be selected after the user accesses the tab for additional feature score information. The user can then select the tab for one or more of the restaurants of interest to see the supplemental feature score information for the restaurant related to the desired features. In this situation, the reported feature scores can correspond to a feature score location that matches the point location of the restaurant. Alternatively, the user could specify that a feature score should be returned for a specified area around a restaurant.

Another option for accessing feature scores is to use an application that allows a user to directly investigate feature scores for a desired point or area. In one aspect, a user can use feature score information to investigate a local area. For example, a user can start by specifying one or more desired feature scores of interest. A feature score location can then be selected based on the user's current position, based on a point location selected by a user on a map, and/or based on a bounding shape defining an area around a selected point. Feature scores for the feature score location (point, line, or area) can then be displayed. Optionally, a map can also be displayed showing the feature score location. Optionally, such a map can display any other conventionally available features, such as showing locations for restaurants, golf courses, shopping centers, or other entities of interest. The user can then move the feature score location on the map by selecting another point on the map, by dragging or moving the feature score location on the map display area, or by any other convenient method. The user can also change the zoom level of the map to provide more detail or more context for the feature score location relative to the displayed map area.

In another aspect, an application can allow a user to search for points or areas having a desired feature score. A user can specify an area, such as a city, portion of a city, neighborhood, or another area as a search location. The user can then specify desired threshold scores for one or more features. Points and/or areas within the search location with sufficiently high feature score(s) can then be displayed. As a variation on this type of aspect, a user can also specify two or more areas in order to compare the feature scores between the areas.

In general, the feature score location and the selected features for generating a feature score can be selected in any convenient order. Thus, the feature score location can be selected prior to selecting the features of interest for viewing a feature score, or the feature score location can be selected after selecting the features, or the feature score location can be selected prior to some features and after other features. In embodiments where a sampling area is defined, this can indicate that a user is searching for feature score locations that correspond to one or more feature scores that satisfy threshold value(s). In such embodiments, the sampling area can be determined prior to, after, or both prior to and after selection of features. Similarly, the feature thresholds can be identified or determined prior to and/or after either the determination of the sampling area or selection of the features.

Creation of Secondary Values

In some aspects, the scoring model for a plurality of feature scores can be based on the same scoring scale. In such aspects, a user can create secondary values that represent combinations of available features. Such secondary features can represent a weighted linear combination of available feature values. For example, a user may desire a customized "entertainment" measurement as a secondary value. The user defines this secondary value based on features corresponding to dining, live music, movie theaters, and accessibility (measure of traffic and parking in an area). The user can combine these values with the same weights, or the user can select weighting factors for each feature to create a desired weighted average. This allows a user to define and personalize their own feature scores. In this example, the user could select a weighting factor of 0.5 for dining, 0.2 for live music, 0.2 for movie theaters, and 0.1 for accessibility. After defining the secondary value, the secondary value can be displayed as another feature for any feature score location. Since continuous functions are provided for the scoring model for each feature used to form the secondary value, the secondary value is also available for any desired feature score location.

Determining Covariance of Values in High Population Areas

In some aspects, a desired feature may not have any identified data within a basis grid area. This can be due to the feature actually being missing, or it can be due to a lack of available information from the sources used for obtaining feature data. One method for handling feature scores for basis grid areas with missing features is to simply fit the scoring model based on the features present in other basis grid areas. As noted above, the basis functions for individual basis grid areas generally have non-zero values in adjacent or nearby basis grid areas. Thus, a basis grid area with missing data will often have a non-zero feature score due to this overlap from other nearby basis grid areas that do contain identified features.

In areas with sufficient population density, another option can be to infer feature data for a basis grid area based on other features present in the basis grid area. Potential inference values for features can be determined by forming a covariance matrix. As an initial filter, the basis grid areas included in a covariance matrix can be limited to areas with a sufficient population density, as high population areas would be expected to have a more reliable correlation between features. As a second filter, the covariance for a feature can be determined based only on basis grid areas that contain identified features. In other words, basis grid areas that do not contain feature data for a given feature are not used in determining covariances involving that feature.

The feature scores for a plurality of features in a plurality of basis grid areas can be analyzed to identify correlations. Any convenient statistical method for analyzing covariance can be used. As a hypothetical example, for urban and suburban areas (i.e., sufficient population density) in California, Oregon, and Washington state, basis grid areas with a dining score of at least 60 on a scale of 1-100 correlate with having a "wine" score of at least 40. Because the dining feature has identified feature data in almost every basis grid area, this covariance can be valuable for providing feature scores for the less commonly reported wine feature. For basis grid areas with sufficient population density, a dining score of at least 60, and a missing value for the wine feature, data for the wine feature can be inferred for the basis grid area. Examples for he inferred value can correspond to the minimum correlation value, which is 40 in this example, or the inferred value can be a fraction of the dining value used to infer the wine value. This inferred value derived from covariance of the dining and wine features can then be used for basis grid areas with missing wine feature data during regularization of the scoring model, as described above.

EXAMPLE 1

Integration of Feature Scores with Search Results

In this example, a user is interested in finding a hotel in a city the user is not familiar with. The user would like to select a hotel that is part of the My-Favorite-Hotel chain of hotels in San Diego.

Figure 1:
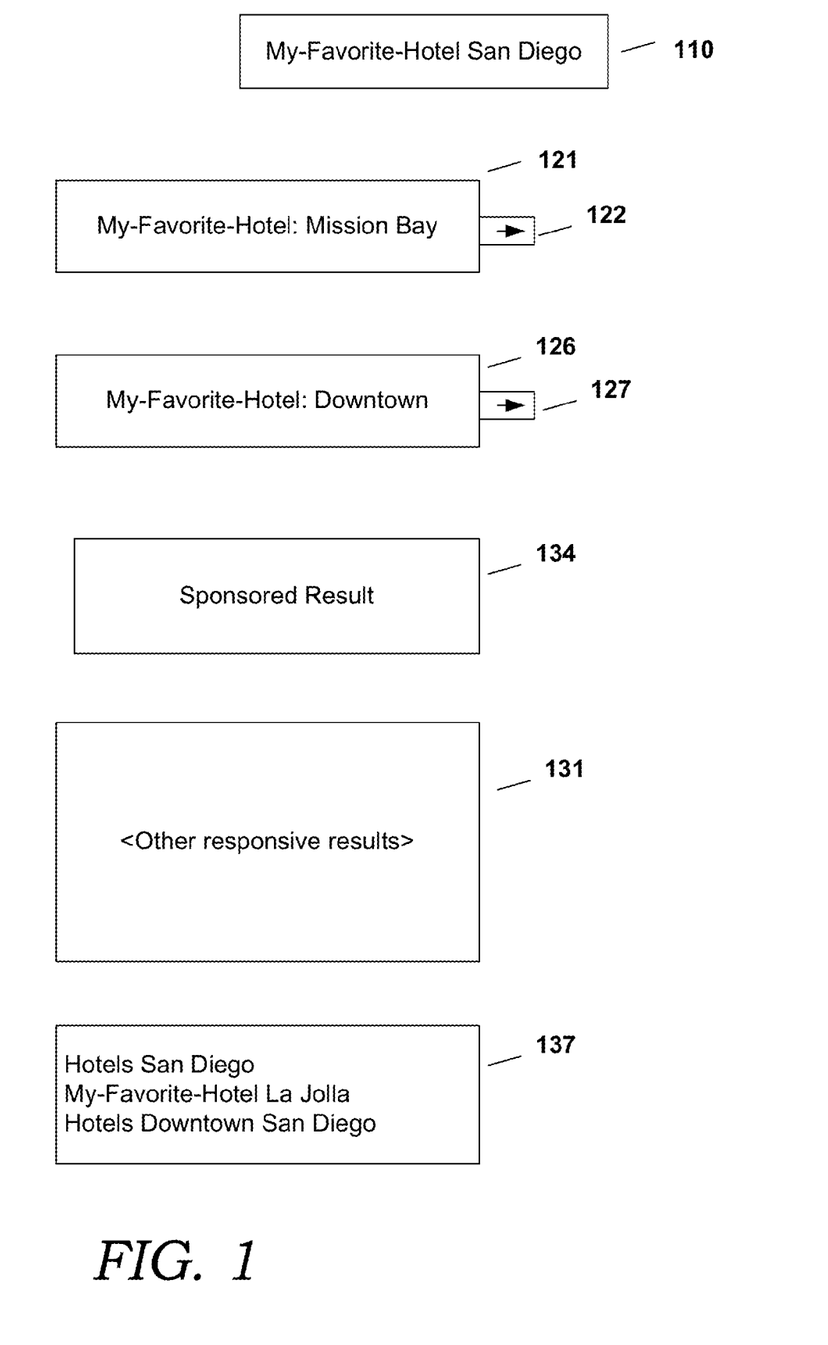
FIGS. 1-3 schematically show examples of display of feature scores in a search environment.

FIG. 1 schematically shows an example of results page displayed to the user in response to entering the search query "My-Favorite-Hotel San Diego" in a search query box 110. This generates at least two responsive results 121 and 126 corresponding to different locations of the My-Favorite-Hotel in San Diego. Other conventional results displayed by a search engine and/or another application can also be provided, such as other responsive results 131, suggested queries 134, and a sponsored result 137. Responsive results 121 and 126 also include tabs 122 and 127 that can be selected by the user to display additional information about the results.

Figure 2:
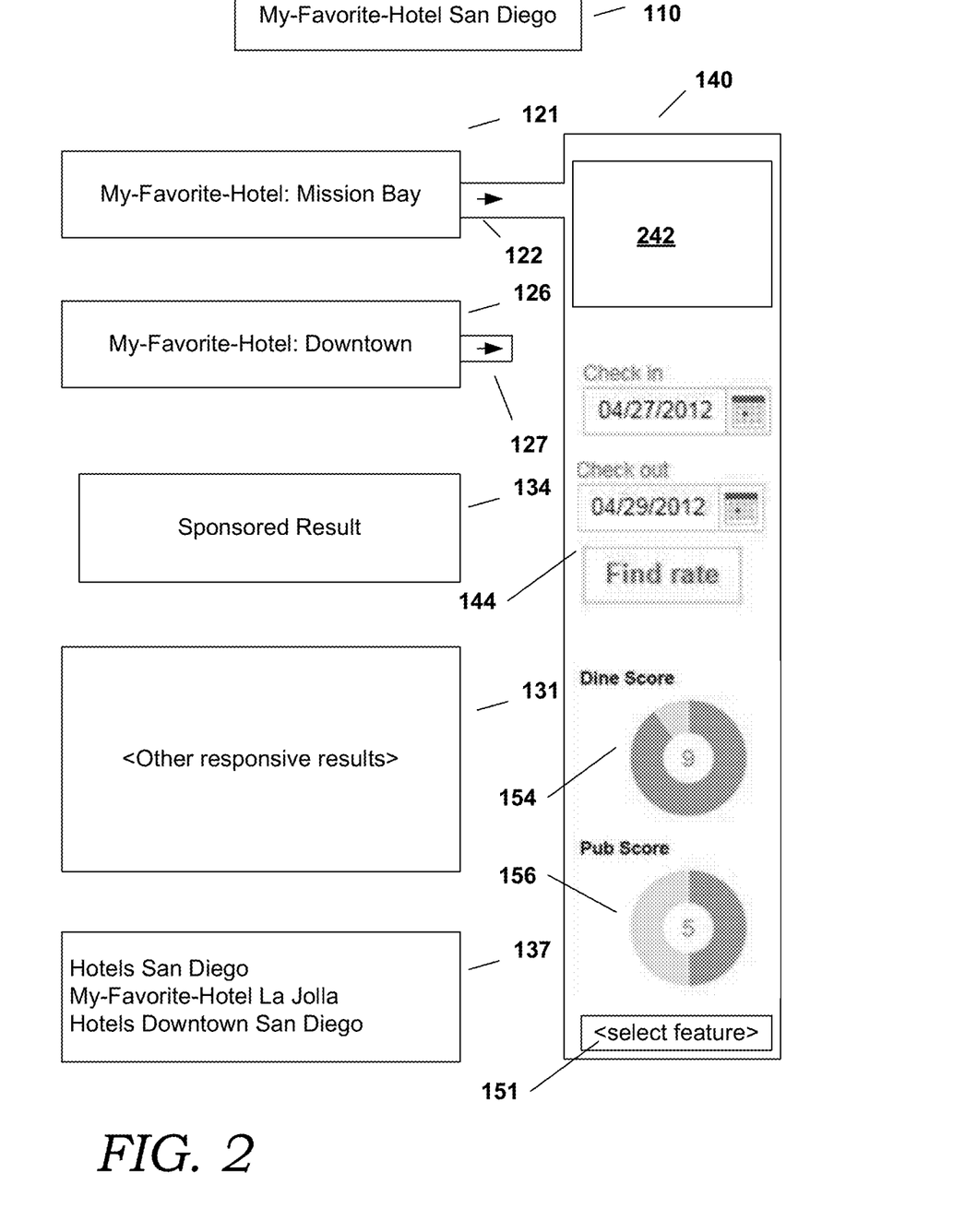

FIG. 2 schematically shows an example of the results page after the user has selected tab 122. This brings up a side bar area 140 that shows a variety of information about responsive result 121. Side bar area 140 includes a map 242 showing the local area around the hotel in result 121, an interface 144 for checking room availability, and a feature score area. In this example, the feature score area includes a drop down menu 151 for selection of feature scores for display. Optionally, drop down menu 151 can include any secondary values defined by the user, as well as an option for showing an interface to create additional secondary values. The feature score area also shows two feature scores 154 and 156 that have been selected for display by the user. Feature score 154 provides a dining score of 9 for the hotel in result 121 while feature score 156 provides a pub score for the hotel result 121. In FIG. 2, the features scores 154 and 156 are displayed as numbers within a partially filled ring. This provides a user with context to understand that the scores are calculated based on values between 0 and 10. It is noted that the feature score can be displayed with additional decimal places if desired, such as displaying a dining score of 8.9 and a pub score of 5.2.

Figure 3:
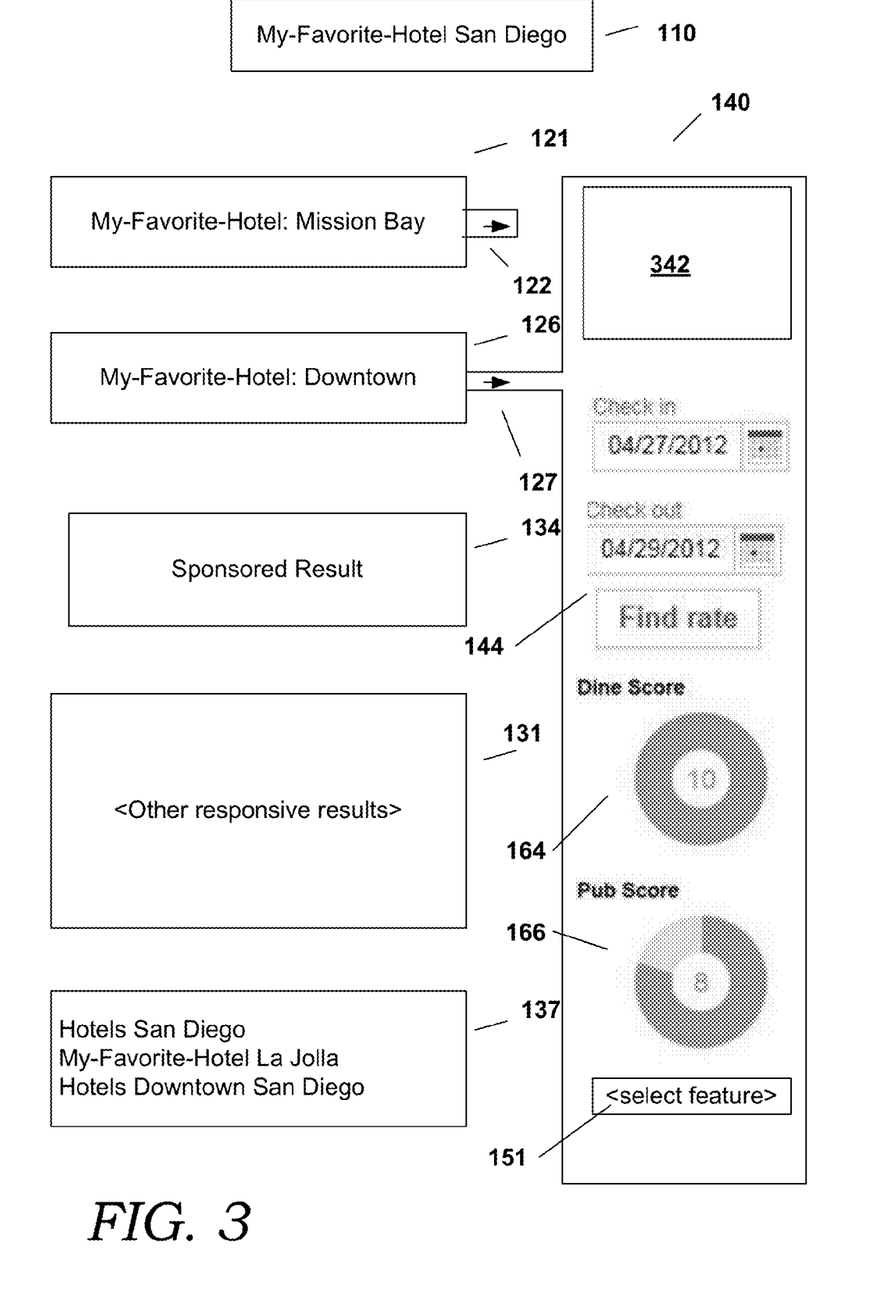

FIG. 3 schematically shows an example of the results page after the user has selected tab 127. The results page in FIG. 3 provides similar information to the results page in FIG. 2, but the side bar information is now related to result 126, such as map 342 related to the location of the hotel in result 126. As shown in FIG. 3, the dining score 164 for the hotel location in result 122 is 10 while the pub score is 8. Based on this feature score information, the user can readily understand that the hotel in result 122 has a better variety of nearby restaurants and/or bars, and therefore is a better choice to stay at during a business trip when his evenings are free.

EXAMPLE 2

Filtering Search Results with Feature Scores

Figure 4:
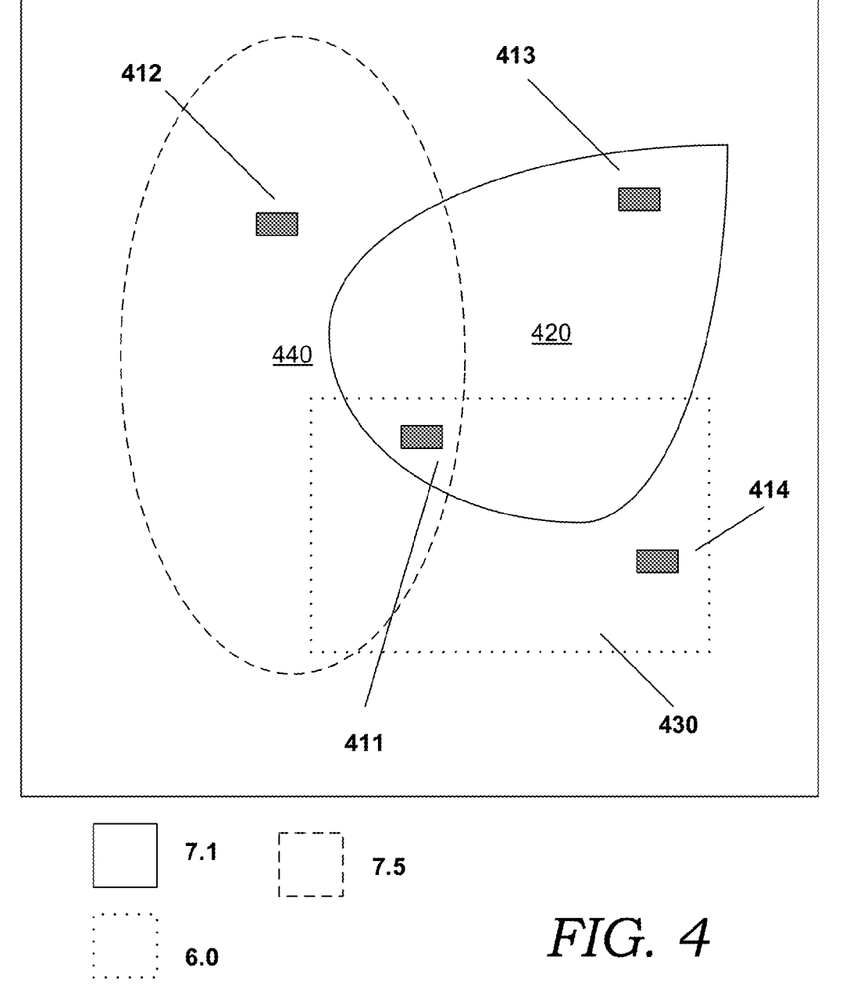
FIG. 4 schematically shows an example of another method for displaying feature score information.

In this example, feature scores are used for filtering information within an application, such as an application for identifying a desirable house for sale in a city. FIG. 4 schematically shows an example of a map display for displaying houses that are for sale. In FIG. 4, the explicitly shown locations 411, 412, 413, and 414 represent houses within the area of display that are for sale. In FIG. 4, three additional areas are also schematically depicted. The area 420 contained within the solid line represents an area with a pedestrian access or walkability score of at least 7.1 (on a scale of 0.0-10.0). The area 430 within the dotted line represents an area with an accessibility score (based on proximity to a major thoroughfare) of at least 6.0. The area 440 within the dashed line represents an area with a score for a secondary value of at least 7.5. The secondary value specified in this example is an average of a crime frequency feature and a school quality feature. As shown in FIG. 4, only one of the 4 houses (house 411) falls within a region that is intersected by all three of the additional areas 420, 430, and 440.

Depending on the aspect, the type of information shown in FIG. 4 could be displayed by highlighting the locations (such as houses) that satisfy all criteria, with other shading/colors used for locations that meet fewer than all of the criteria. Alternatively, the areas 420, 430, and 440 could be displayed as transparent masks. Still other options for visualizing feature information in combination with a desired search object can be used based on the nature of the feature information.

EXAMPLE 3

Display of Underlying Features

Figure 5:
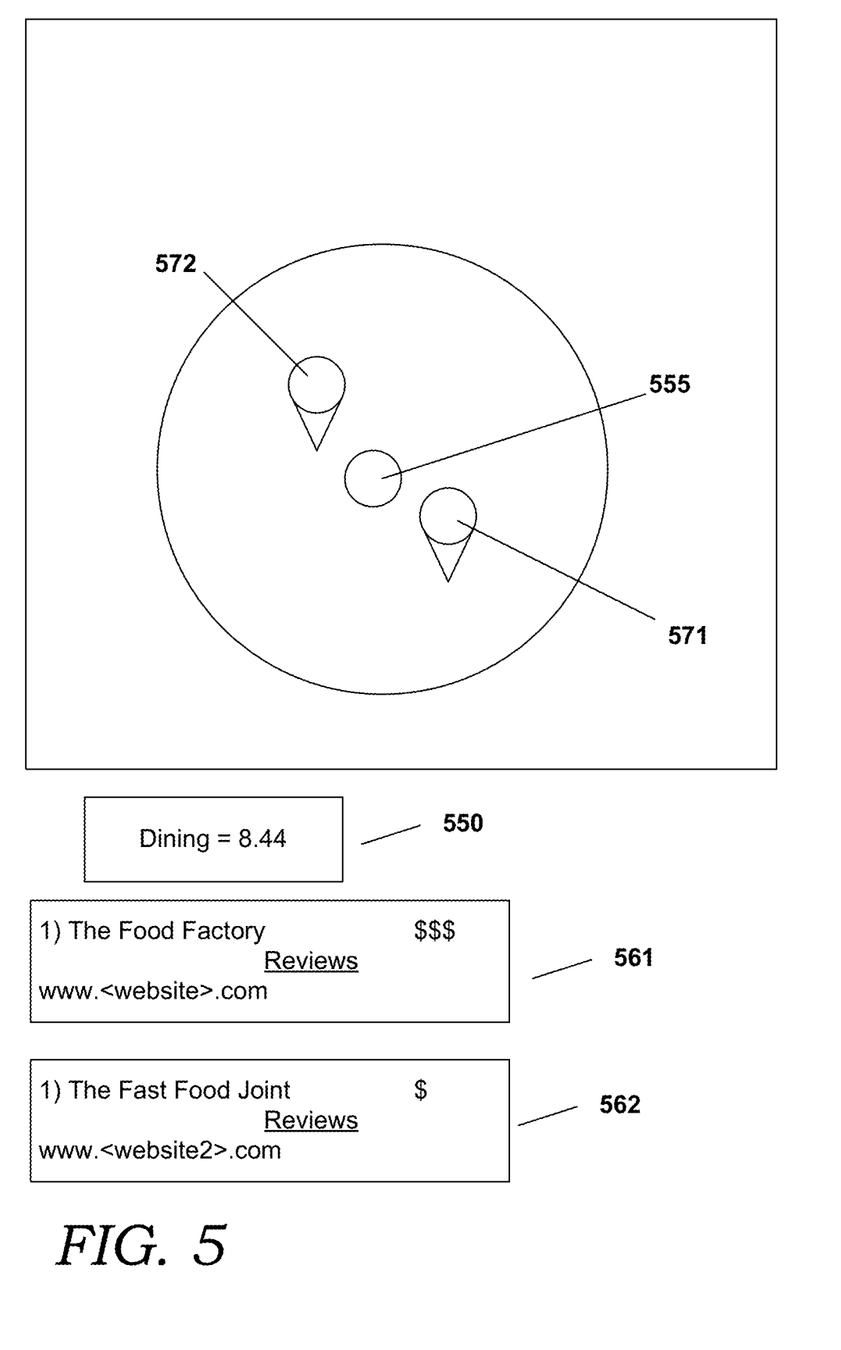
FIG. 5 schematically shows an example of another method for displaying feature score information.

FIG. 5 shows an example of a map area displayed to a user on a mobile device. The user has requested a display of the feature score 550 for dining based on a user selected point, such as the current position 555 of the user. In FIG. 5, a plurality of markers, such as markers 571 and 572, are also displayed. The markers 571 and 572 correspond to features that were identified as relevant for calculation of the scoring model to produce feature score 550. In the display example shown in FIG. 5, in addition to showing the feature score 550 and markers 571 and 572, a description is also provided of the identified features 561 and 562 corresponding to markers 571 and 572, respectively. The descriptions 561 and 562 can include items such as a link to the web site for the feature, information about the feature, reviews about the feature, and/or other information that might be displayed as part of a search results page.

Providing a view to a user that shows the underlying features for a feature score can provide a user with further insight into the meaning of a feature score. For example, a user could search for areas within a city that have a dining score greater than a threshold value. Having identified the areas with a high dining score, the user can then focus on those areas and view the underlying restaurants that contributed to the high dining score. This can allow a user that is unfamiliar with a city or neighborhood to quickly access detailed information about various types of features.

EXAMPLE 4

Area Comparison

In this example, a user desires to compare the shopping quality present in two nearby areas. The user would like to select an area with good shopping quality but with low traffic congestion. First, the user defines a secondary value with a weighting of 0.6 for shopping and a weighting of 0.4 for traffic. The user then specifies two areas known to have shopping malls to see the feature score for the secondary value.

In this example, maps are displayed to the user for the two areas requested. Below the maps is a large display of the feature score for the secondary value requested by the user, as well as smaller displays for the feature scores for the underlying features used to form the secondary value. If desired, the smaller displays of the scores for the underlying features could be omitted.

ADDITIONAL EXAMPLES

Having briefly described an overview of various embodiments of the invention, an exemplary operating environment suitable for performing the invention is now described. Referring to the drawings in general, and initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

Figure 7:
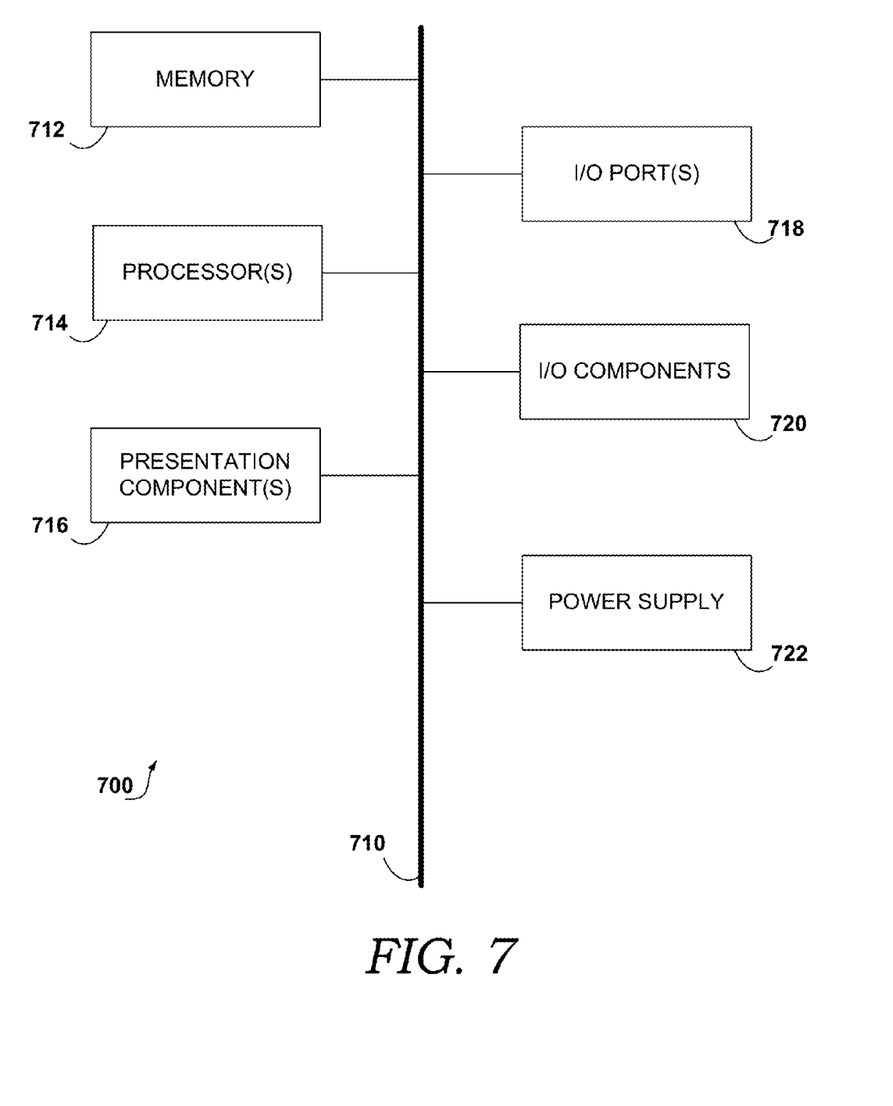
FIG. 7 is a block diagram of an exemplary computing environment suitable for use in implementing some embodiments of the invention.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," "tablet," etc., as all are contemplated within the scope of FIG. 7 and reference to "computing device."

The computing device 700 typically includes a variety of computer-readable media. Computer-readable media can be any available media that can be accessed by computing device 700 and includes both volatile and nonvolatile media, removable and non-removable media. Computer-readable media can be used to store any convenient type of information, including executable instructions or software, acquired or generated data, and/or anything else typically stored for use by or as an output from a processor. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 700. In an embodiment, the computer storage media can be selected from tangible computer storage media. This definition of computer storage media excludes any media that is considered a "signal per se".

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 712 can include computer-storage media in the form of volatile and/or nonvolatile memory. The memory may be removable, non-removable, or a combination thereof. Exemplary hardware devices include solid-state memory, hard drives, optical-disc drives, etc. The computing device 700 includes one or more processors that read data from various entities such as the memory 712 or the I/O components 720. The presentation component(s) 716 present data indications to a user or other device. Exemplary presentation components include a display device, speaker, printing component, vibrating component, and the like.

The I/O ports 718 can allow the computing device 700 to be logically coupled to other devices including the I/O components 720, some of which may be built in. Illustrative components can include a microphone, joystick, game pad, satellite dish, scanner, printer, wireless device, etc. The I/O components can include components that receive one or more input types from a plurality of input types, such as touch input (e.g., touching or proximity to a display interface, as opposed to indirect movement on a display based on interaction with a keyboard or mouse), gesture input, haptic input, voice input, proximity input, interaction with a secondary input device such as the input devices identified above, or any other convenient type of input.

Figure 6:
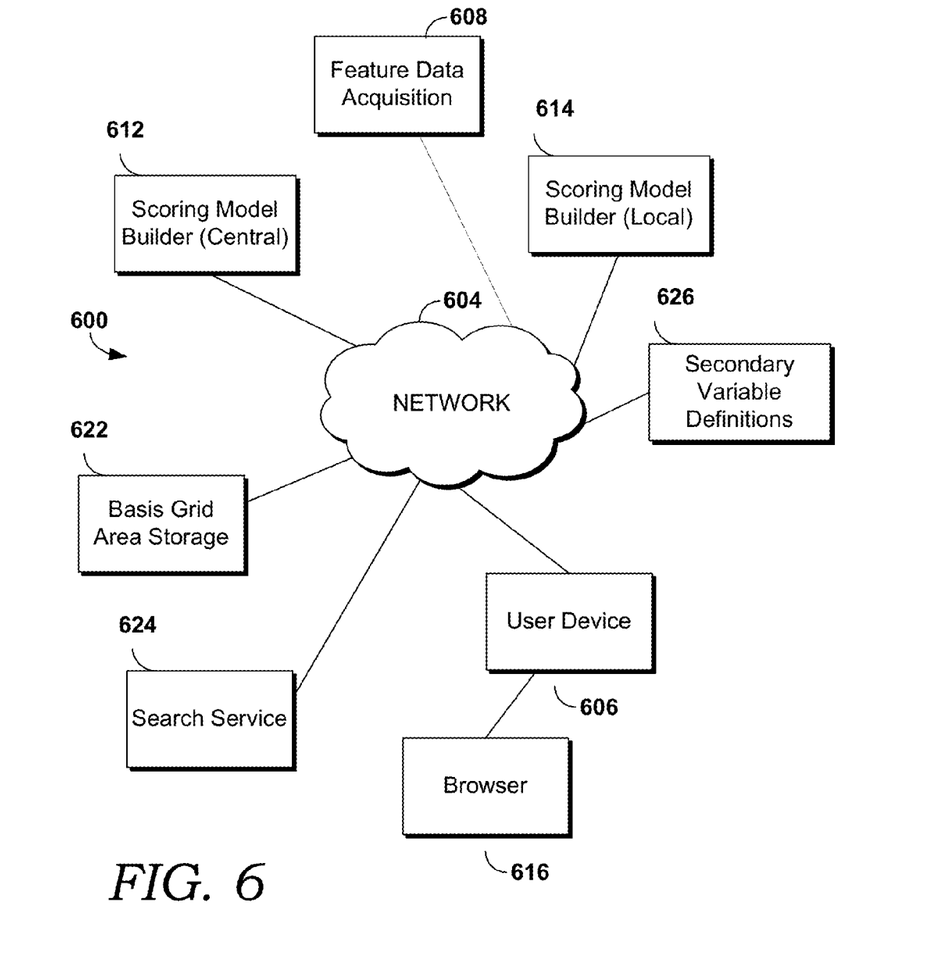
FIG. 6 schematically shows a network environment suitable for performing some embodiments of the invention.

With additional reference to FIG. 6, a block diagram depicting an exemplary network environment 600 suitable for use in embodiments of the invention is described. The environment 600 is but one example of an environment that can be used in embodiments of the invention and may include any number of components in a wide variety of configurations. The description of the environment 600 provided herein is for illustrative purposes and is not intended to limit configurations of environments in which embodiments of the invention can be implemented.

The environment 600 includes a network 604, a user device 606, which includes a user browser 616, a feature data acquisition service 608 and a scoring model builder 612. Scoring model builder 612 represents a primary build component for fitting basis functions to basis grid areas and for updating scoring models for features. However, locally operated versions of a scoring model builder 614 can also be used for some features, such as features that benefit from updates in real time. The environment 600 also includes basis grid area storage 622 for storing information about basis grid areas, such as identified feature data and the current basis function(s) for a basis grid area. The environment 600 can further include a secondary variable definition component 626 for maintaining local user definitions for secondary variables. The environment can also further include a search engine or service 624. The search service 624 can work with feature scores in a variety of manners. In some aspects, a search service can be used to select feature score locations. In other aspects, results identified as responsive by a search service can be filtered based on the results that have corresponding feature scores that satisfy a threshold value.

The network 604 includes any computer network such as, for example and not limitation, the Internet, an intranet, private and public local networks, and wireless data or telephone networks. The user device 606 can be any computing device, such as the computing device 700, from which a search query can be provided. For example, the user device 606 might be a personal computer, a laptop, a tablet, a server computer, a wireless phone or device, a personal digital assistant (PDA), or a digital camera, among others. The scoring model builder 612 can represent a builder that is run on any computing device, such as the computing device 700, and provides some or all of the functionalities described above. Similarly, the feature data acquisition service 608 can represent a service running on any type of computer device that can identify and/or acquire available data over a network that can be used as feature data for constructing a scoring model for a feature.

Figure 8:
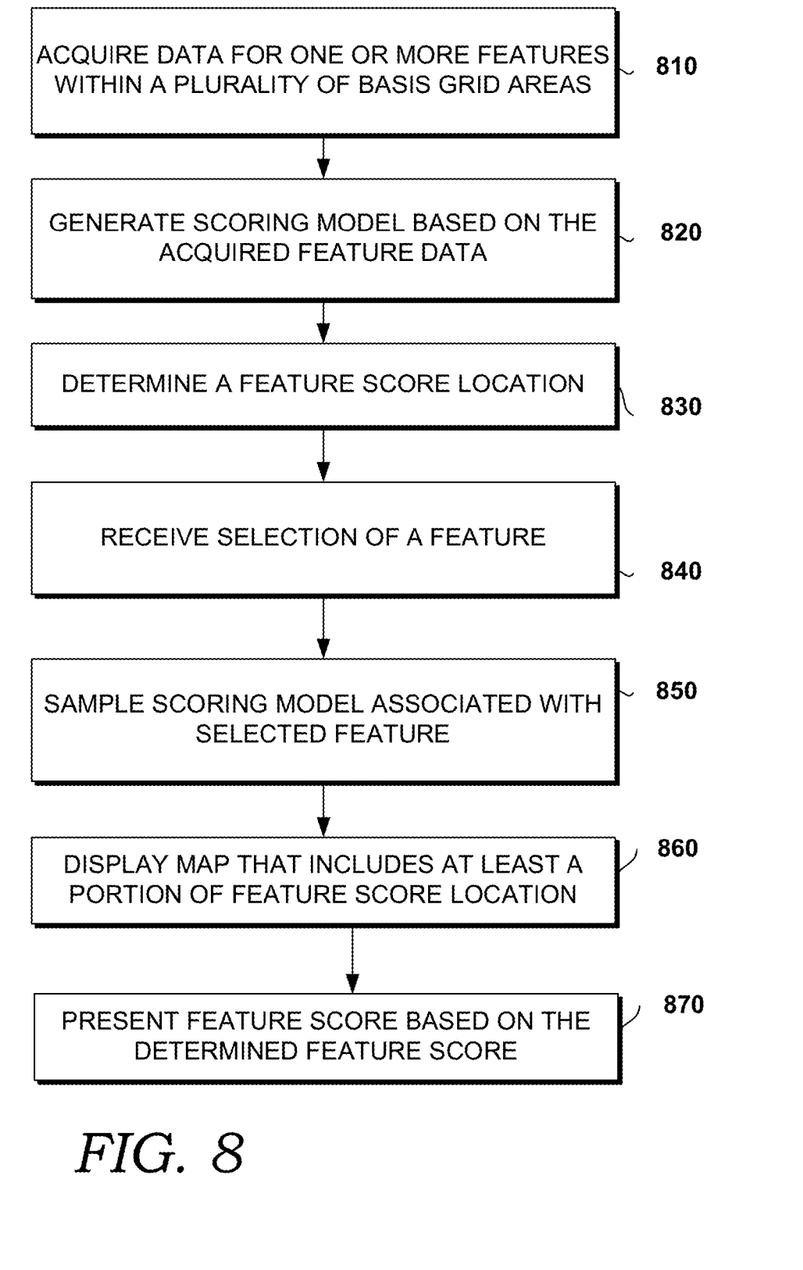
FIGS. 8-10 show examples of methods according to some embodiments of the invention.

FIG. 8 shows an example for a method for presenting feature scores related to a geographic area according to an embodiment of the invention. In the embodiment shown in FIG. 8, data is acquired 810 for one or more features within a plurality of basis grid areas. For each feature of the one or more features, a scoring model is generated 820 based on the acquired feature data in the plurality of basis grid areas. The scoring model comprises a continuous scoring model within the plurality of basis grid areas. A feature score location is then determined 830, the determined feature score location being contained within the one or more basis grid areas. A selection of a feature is also received 840. The scoring model associated with the selected feature is then sampled 850 to determine a feature score. A map is displayed 860 that includes at least a portion of the determined feature score location. A feature score based on the determined feature score is then presented 870. The feature score based on the determined feature score can be, for example, a secondary value defined by a user that is based on sampling of a scoring model for two or more features. The feature score can be displayed, for example, in association with displayed map and/or in association with additional description for a point or area in the displayed map.

Figure 9:
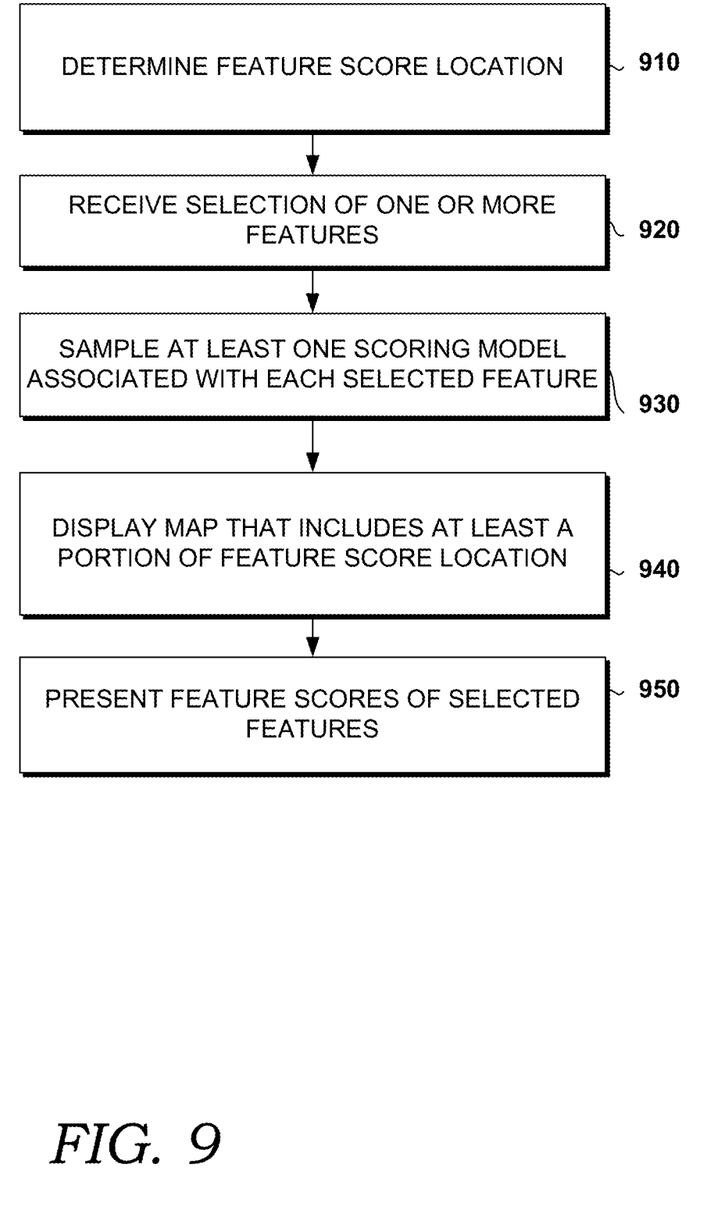

FIG. 9 shows an example of a method for presenting feature scores related to a geographic area is provided according to another embodiment of the invention. In the embodiment shown in FIG. 9, a feature score location is determined 910. The feature score location can be determined based on a user input defining a point or area. Another option is to infer the feature score location based on user context, such as the current user position. Still another option is to determine the feature score location based on a location for a responsive result to a search query. A selection of one or more features is also received 920. Each selected feature is associated with at least one scoring model. The scoring model(s) associated with a selected feature are continuous scoring model(s) defined over one or more basis grid areas. The determined feature score location is contained within the one or more basis grid areas. It is noted that in various embodiments, the features can be selected before, after, or both before and after the determination 910 of the feature score location. The at least one scoring model associated with each selected feature is then sampled 930 to determine feature scores for the one or more selected features. The sampling can correspond to sampling a single point, sampling a plurality of points within an area (such as within a bounding shape), or integrating the scoring model over a desired area. A map is displayed 940 that includes at least a portion of the determined feature score location. The feature scores of the selected features are then presented 950, such as in association with displayed map and/or in association with additional description for a point or area in the displayed map.

Figure 10:
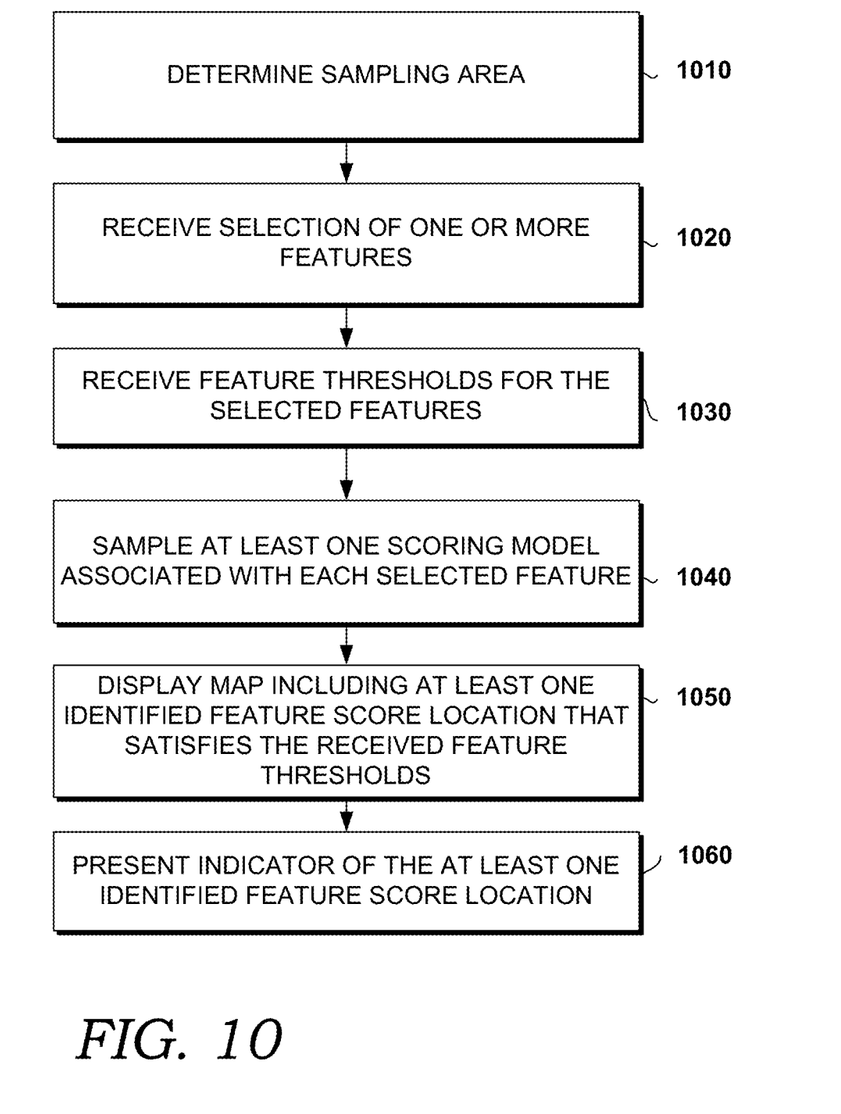

FIG. 10 shows an example for a method for presenting feature scores related to a geographic area according to another embodiment of the invention. In the embodiment shown in FIG. 10, a sampling area is determined 1010. The sampling area can correspond, for example, to an area specified by a user where the user would like to identify feature score locations with a feature score that satisfies a threshold value. A selection of one or more features is also received 1020. Preferably, each selected feature is associated with at least one scoring model. Preferably, a scoring model comprises a continuous scoring model over one or more basis grid areas. The determined sampling area can be contained within the one or more basis grid areas. Feature thresholds are also received 1030 for the one or more selected features. The at least one scoring model associated with each selected feature is then sampled 1040 to identify at least one feature score location within the sampling area having feature scores for the one or more selected features that satisfy the received feature thresholds. A map is displayed 1050 that includes the at least one feature score location. It is noted that the map can be displayed prior to the identification of the feature score location. An indicator is then presented 1060 of the at least one identified feature score location on the displayed map.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, a method for presenting feature scores related to a geographic area is provided. The method includes determining a feature score location; receiving a selection of one or more features, each selected feature being associated with at least one scoring model, a scoring model associated with a selected feature comprising a continuous scoring model defined over one or more basis grid areas, the determined feature score location being contained within the one or more basis grid areas; sampling the at least one scoring model associated with each selected feature to determine feature scores for the one or more selected features; displaying a map that includes at least a portion of the determined feature score location; and presenting the feature scores of the selected features.

In another embodiment, a method for presenting feature scores related to a geographic area is provided. The method includes determining a sampling area; receiving a selection of one or more features, each selected feature being associated with at least one scoring model, a scoring model comprising a continuous scoring model over one or more basis grid areas, the determined sampling area being contained within the one or more basis grid areas; receiving feature thresholds for the one or more selected features; sampling the at least one scoring model associated with each selected feature to identify at least one feature score location within the sampling area having feature scores for the one or more selected features that satisfy the received feature thresholds; displaying a map that includes the at least one feature score location; and presenting an indicator of the at least one identified feature score location on the displayed map.

In still another embodiment, a method is provided for presenting feature scores related to a geographic area. The method includes acquiring data for one or more features within a plurality of basis grid areas; generating, for each feature of the one or more features, a scoring model based on the acquired feature data in the plurality of basis grid areas, the scoring model comprising a continuous scoring model within the plurality of basis grid areas; determining a feature score location, the determined feature score location being contained within the one or more basis grid areas; receiving a selection of a feature; sampling the scoring model associated with the selected feature to determine a feature score; displaying a map that includes at least a portion of the determined feature score location; and presenting a feature score based on the determined feature score.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for presenting feature scores related to a geographic area, comprising:
   determining a feature score location;
   receiving a selection of one or more features, each selected feature being associated with at least one scoring model, a scoring model associated with a selected feature comprising a smooth, continuous scoring model defined over a plurality of basis grid areas, the determined feature score location being contained within the plurality of basis grid areas, the scoring model being continuous at a boundary between basis grid areas;
   sampling the at least one scoring model associated with each selected feature to determine feature scores for the one or more selected features;
   displaying a map that includes at least a portion of the determined feature score location; and
   presenting the feature scores of the selected features.

2. The method of claim 1, wherein the feature score location comprises at least one of a point or an area within a bounding shape.

3. The method of claim 1, wherein defining a continuous scoring model over a basis grid area comprises fitting the continuous scoring model to one or more features within the basis grid area, fitting the continuous scoring model to one or more basis functions associated with features in a basis grid area, or a combination thereof.

4. The method of claim 3, wherein defining the continuous scoring model over a basis grid area further comprises fitting the continuous scoring model in a first basis grid area to one or more basis functions associated with features in a second basis grid area, the second basis grid area being different from the first basis grid area.

5. The method of claim 1, wherein one or more features within a basis grid area comprise social media features, at least one social media feature corresponding to a check-in feature for an entity or geographic area, a like feature for an entity or geographic area, or a combination thereof.

6. The method of claim 1, wherein sampling the scoring model comprises integrating the scoring model over an area corresponding to the determined feature score location, and dividing the integrated value by the area corresponding to the determined feature score location, or wherein sampling the scoring model comprises determining a value of the scoring model at a plurality of points within a bounding shape corresponding to the feature score location.

7. The method of claim 6, wherein presenting the feature scores of a selected feature comprises presenting the values of the scoring model at two or more of the plurality of points within the bounding shape.

8. The method of claim 6, wherein sampling the scoring model further comprises summing the scoring model values at the plurality of points and dividing by a number corresponding to the plurality of points.

9. The method of claim 1, wherein determining a feature score location comprises selecting a location associated with a responsive result to a search query.

10. The method of claim 1, wherein presenting a feature score of a selected feature comprises displaying the feature score and an indicator of a range of possible feature scores.

11. The method of claim 1, wherein at least one selected feature comprises a secondary value, the feature score for the secondary value being determined based on sampling of two or more scoring models.

12. The method of claim 1, wherein the continuous scoring model defined over the plurality of basis grid areas comprises a smooth, continuous scoring model defined over the plurality of basis grid areas.

13. A system for presenting feature scores related to a geographic area, comprising:
   a processor and associated memory, the processor executing computer-executable instructions to:
   determine a sampling area;
   receive a selection of one or more features, each selected feature being associated with at least one scoring model, a scoring model comprising a smooth, continuous scoring model defined over a plurality of basis grid areas, the determined sampling area being contained within the plurality of basis grid areas;
   receive feature thresholds for the one or more selected features;

sample the at least one scoring model associated with each selected feature to identify at least one feature score location within the sampling area having feature scores for the one or more selected features that satisfy the received feature thresholds;

display a map that includes the at least one feature score location; and present an indicator of the at least one identified feature score location on the displayed map.

14. The system of claim 13, wherein the sampling area comprises a pre-defined geographic area, an area within a bounding shape, or a combination thereof.

15. The system of claim 13, wherein a received feature threshold is satisfied based on a feature score being greater than a first threshold value, a feature score being less than a second threshold value, or a combination thereof.

16. The system of claim 13, wherein presenting an indicator of the at least one feature score location comprises displaying areas corresponding to areas where each feature satisfies a feature threshold.

17. A method for presenting feature scores related to a geographic area, comprising:

acquiring data for one or more features within a plurality of basis grid areas;

generating, for each feature of the one or more features, a scoring model based on the acquired feature data in the plurality of basis grid areas, the scoring model comprising a smooth, continuous scoring model within the plurality of basis grid areas, at least one basis grid area comprising multiple points of acquired feature data, at least one Gaussian function being used to represent the acquired feature data;

determining a feature score location, the determined feature score location being contained within the one or more basis grid areas;

receiving a selection of a feature;

sampling the scoring model associated with the selected feature to determine a feature score;

displaying a map that includes at least a portion of the determined feature score location; and presenting a feature score based on the determined feature score.

18. The method of claim 17, wherein the scoring model is generated based on fitting the scoring model to one or more basis functions associated with features in a basis grid area.

19. The method of claim 17, wherein acquiring data within a plurality of basis grid areas comprises acquiring one-dimensional or two-dimensional data.

20. The method of claim 17, wherein the scoring model is continuous at a boundary between basis grid areas.

* * * * *